(12) United States Patent
Heinemann et al.

(10) Patent No.: US 6,882,986 B1
(45) Date of Patent: Apr. 19, 2005

(54) METHOD FOR AUTOMATIC PROCESSING OF INVOICES

(75) Inventors: Robert E. Heinemann, West Hartford, CT (US); Scott D. Holliday, Burlington, CT (US); Frank E. Mikulak, Plymouth, CT (US)

(73) Assignee: Tymetrix, Hartford, CT (US)

( * ) Notice: Subject to any disclaimer, the term of this patent is extended or adjusted under 35 U.S.C. 154(b) by 554 days.

(21) Appl. No.: 09/633,216

(22) Filed: Aug. 7, 2000

(51) Int. Cl.[7] .............................................. G06F 17/60
(52) U.S. Cl. ........................... 705/40; 705/39; 705/24; 705/30; 705/34; 380/24
(58) Field of Search ............. 705/40, 39, 30, 705/34

(56) References Cited

U.S. PATENT DOCUMENTS

| | | | | |
|---|---|---|---|---|
| 3,852,571 A | * | 12/1974 | Hall et al. ................. | 235/379 |
| 4,484,304 A | * | 11/1984 | Anderson et al. .......... | 715/733 |
| 4,485,300 A | * | 11/1984 | Peirce ....................... | 235/380 |
| 4,701,601 A | * | 10/1987 | Francini et al. ............. | 235/449 |
| 4,734,564 A | * | 3/1988 | Boston et al. ............... | 235/380 |
| 4,799,156 A | * | 1/1989 | Shavit et al. ............... | 705/26 |
| 5,655,089 A | | 8/1997 | Bucci ........................ | 395/241 |
| 5,875,435 A | * | 2/1999 | Brown ........................ | 705/30 |
| 5,943,656 A | * | 8/1999 | Crooks et al. ............... | 705/30 |
| 5,956,700 A | * | 9/1999 | Landry ........................ | 705/40 |
| 6,052,671 A | | 4/2000 | Crooks et al. ............... | 705/34 |

FOREIGN PATENT DOCUMENTS

JP            94/240787       *   4/1999   .................. 705/52

OTHER PUBLICATIONS

"NetBill: An Internet Commerce System Optimized for Network Delivered Services," by M. Sirbe et al., Carnegie Mellon Univ., Feb. 27, 1995.*

* cited by examiner

Primary Examiner—James P. Trammell
Assistant Examiner—Daniel L. Greene
(74) Attorney, Agent, or Firm—McCormick, Paulding & Huber LLP

(57) ABSTRACT

A computerized method of automatically generating payment for electronic billing data including automatically obtaining billing data in an electronic format from a billing party for a billable party, and automatically comparing the billing data with rule data defined by the billable party. The method includes automatically authorizing generation of payment data for the billing party if the billing data satisfies the comparison with the rule data.

7 Claims, 10 Drawing Sheets

Pro Forma Budgets

Firm [ABC] ~124

Complexity [Moderate] ~120

Hourly Rate [$109.28]

Claim [123L4567]

Case Strength [Moderate]

Strategy [Defend] ~122 [Revise]
~164

| CATEGORY ~100 | Concentration | Estimated Hours ~116 Hours | Costs ~118 |
|---|---|---|---|
| Assessment/Development/Admin | 20.30% | 33.292 | $3,638.17 |
| Pre-Trial Pleadings/Motions ~102 | 19.40% | 31.816 | $3,476.87 |
| Discovery ~104 | 25.90% | 42.476 | $4,641.80 |
| Trial Preparation and Trial ~106 | 34.40% | 56.416 | $6,165.17 |
| Appeal ~108 | 0.00% | 0 | $0.00 |
| Total Fees: | | | $17,922.00 |
| | Factor | | |
| Expenses: ~110 | 23.00% | | $4,122.06 |
| Total Budget: | | | $22,044.06 |
| Show Source | | | Save Budget |

~112 ~114

OPERATIONS
Initial Case Assessment
Case Evaluation
Case Profile
Case Budgets
Firm Self Evaluation
Case Assignment
Timekeeping
Auditor Operations
Main Menu

FIG. 8

Category/Task — 100

Assessment/Development/Admin
L110 Fact Investigation/Development
L120 Analysis/Strategy
L130 Experts/Consultants
L140 Document/File Management
L150 Budgeting
L160 Settlement/Non-binding ADR
L190 Other

Pre-Trial Pleadings/Motions — 102
L210 Pleadings
L220 Preliminary Injunctions/Provisional Remedies
L230 Court Mandated Conference
L240 Dispositive Motion
L250 Other Written Motions/Submissions
L260 Class Action Certification and Notice

Discovery — 104
L310 Written Discovery
L320 Document Production
L330 Depositions
L340 Expert Discovery
L350 Discovery Motion
L390 Other Discovery

Trial Preparation and Trial — 106
L410 Fact Witnesses
L420 Expert Witnesses
L430 Written Motions/Submissions
L440 Other Preparation/Support
L450 Trial and Hearing Attendance
L460 Post Trial Motions/Submissions
L470 Enforcement

Appeal — 108
L510 Appellate Motions/Submisssions
L520 Appellate Briefs
L530 Oral Arguments Description
A101 Plan and Prepare For
A102 Research
A103 Draft/Revise
A104 Review/Analyze
A105 Communicate/In Firm
A106 Communicate/With Client
A107 Communicate/Other Counsel
A108 Communicate/Other External
A109 Appear For/Attend
A110 Manage Date/Files
A111 Other Disbursement Categories — 110
E101 Copying
E102 Outside Printing
E104 Long Distance Facsimile
E105 Long Distance Telephone
E106 On-Line Research
E107 Delivery/Messenger
E108 Non-Ordinary Postage
E109 Local Travel
E110 Out-of-Town Travel
E111 Non-Local Meals
E112 Court Fees
E113 Subpoena Fees
E114 Witness Fees
E115 Deposition Transcripts
E116 Trial Transcripts
E117 Trial Exhibits
E118 Litigation Support Vendors
E119 Experts Witness Fees
E120 Private Investigators
E121 Arbitrators/Mediators
E122 Local Counsel
E123 Other Professionals

FIG. 9

126 — Type | 130 Auto/Personal   Jurisdiction | New York City — 128
Plaintiff Counsel | A B C    140    Initial Demand | $300,000.00 — 132
136 — Limits | $250,000.00   Estimated Liability | $60,000.00   Source |
138 — Trial Probability | Moderate   Complexity | Moderate   Strategy | Defend
Expected Case Hours | 63   Partner | 13.23   Associate | 40.32   Paralegal | 9.45 — 142
Please enter any other information that you feel is The Firms Listed Below Are Qualified for Assignment to This Case Select Defense Counsel | D E F   ▼   Enter

FIG. 10

OPERATIONS
Initial Case Assessment
Case Evaluation
Case Profile
Case Budgets
Firm Self Evaluation
Case Assignment
Timekeeping
Auditor Operations
Main Menu

FIG. 11

| | | | |
|---|---|---|---|
| National | By Region | | By Business Line |

Enter the Keyword [        ]  Search

Cases Flagged for Tracking /158    Flagged Cases

| Case | Cause | Date Entered | Date Last Reviewed | Comment |
|---|---|---|---|---|
| 553LP54899 | High Expense /160 | 09/15/1998 | | |
| 634L80623 | High Case Cost /162 | 09/16/1998 | | |
| 553L53132 | High Case Cost | 02/17/1999 | | |
| 553KAP59462 | Budget Variance | 02/17/1999 | | |
| 378KL06948 | High Budgeted Cost | 02/17/1999 | | |
| 553LP04363 | High Case Cost | 02/17/1999 | | |
| 553KLP69336 | High Case Cost | 02/17/1999 | | |
| 332C82287 | High Case Cost | 02/17/1999 | | |
| 739L50547 | Cost to Estimated Exposure | 02/17/1999 | | |
| 494LP83120 | Budget Variance | 02/17/1999 | | |
| 634L80623 | TRACKED FOR High Case Cost | 03/11/1999 | | |
| 553LP54899 | High Case Hours | 03/15/1999 | | |
| 739L50547 | High Case Cost | 03/15/1999 | | |
| 553LP54899 | TRACKED FOR High Case Cost | 04/01/1999 | | |
| 553LP54899 | TRACKED FOR High Case Cost | 08/02/1999 | | |
| 553LP54899 | TRACKED FOR High Case Cost | 08/02/1999 | | |
| 553LP54899 | TRACKED FOR High Case Cost | 10/05/1999 | | |
| 553LP54899 | TRACKED FOR High Case Cost | 10/20/1999 | | |
| 494LP63120 | High Budgeted Cost | 11/17/1999 | | |
| 739L50547 | High Case Cost | 11/17/1999 | | |
| 739L50547 | High Case Cost | 11/17/1999 | | |
| 739L50547 | High Case Cost | 11/17/1999 | | |

Case Review
- Total Case Cost /144
- Total Hours /146
- Total Expense /148
- Estimated Exposure /150
- Cost to Estimated Exposure /152
- Budgeted Costs /154
- Budget Variance /156

Menu

METHOD FOR AUTOMATIC PROCESSING OF INVOICES

FIELD OF THE INVENTION

The present invention relates generally to a method for automatically processing invoices and generating case analysis, and more specifically to a method for the automatic submission, evaluation, payment and analysis of legally-related invoices and related cases.

BACKGROUND OF THE INVENTION

Typically, corporate law departments, claims litigation departments and other businesses had to manually process and pay thousands of legal invoices, sometimes on a weekly basis. In a time consuming process, billing clerks received paper invoices, manually logged the invoice and forwarded them for processing by accounts payable. Once at accounts payable, invoices had to be routed for approval by appropriate personnel, such as a claim handler. In addition, the manual system allowed for very little, if any, analysis of the data contained in those invoices. Managers of these businesses had little control over the data and outcomes, and could never be sure whether they were properly being billed. Managers were never confident whether they were getting a good value for their money.

In addition, law firms were never sure when they would get paid for their services. A law firm's client, especially a large client, might hold onto an invoice for months before the invoice was manually approved by a client's claim handler. At that point, assuming the invoice was approved, the invoice would progress through the client's accounts payable system for payment at some later time. However, if the claim handler found an error in the invoice, whether minor, such as a misspelling of a claim handler's name, or major, such as an invalid case number, the invoice would be marked unsatisfactory, and at some later point, possibly additional months later, be sent back to the law firm. The law firm would then correct the invoice and resubmit the invoice to the client, beginning the process all over again. At best, the law firm might not receive payment for its services for at least a month, and at worst, the invoice could go unpaid for 6 months or more.

Attempts have been made to solve the above problems. Methods and systems of computerized billing and payment authorization have developed, such as disclosed in U.S. Pat. No. 6,052,671 to Crooks et al. Crook's system involves receiving billing information from a billing entity for a billable entity. The billable entity is provided with remote electronic access to the billing information and can electronically authorize payment of associated invoices. However, there is no guarantee that the authorization process will proceed in a timely fashion, since the authorization proceeds upon the time and terms of the billable entity.

An object of the present invention is to provide an unattended, instant, automated processing of invoices including an automated authorization to pay process.

Another object of the present invention is provide reporting tools to the billable party for managing billing party services.

SUMMARY OF THE INVENTION

A computerized method of automatically generating payment for electronic billing data including automatically obtaining billing data in an electronic format from a billing party for a billable party, and automatically comparing the billing data with rule data defined by the billable party. The method includes automatically authorizing generation of payment data for the billing party if the billing data satisfies the comparison with the rule data.

BRIEF DESCRIPTION OF THE DRAWINGS

FIG. 8 is a view of an interactive computer screen implemented in connection with a preferred embodiment of the present invention;

FIG. 9 is a chart illustrating an example of corporate billing codes utilized for rule checking and analysis by a preferred embodiment of the present invention;

FIG. 10 is a view of another interactive computer screen implemented in connection with a preferred embodiment of the present invention; and FIG. 11 is a view of another interactive computer screen implemented in connection with a preferred embodiment of the present invention.

DETAILED DESCRIPTION OF THE PREFERRED ENVIRONMENT

Figure 1:
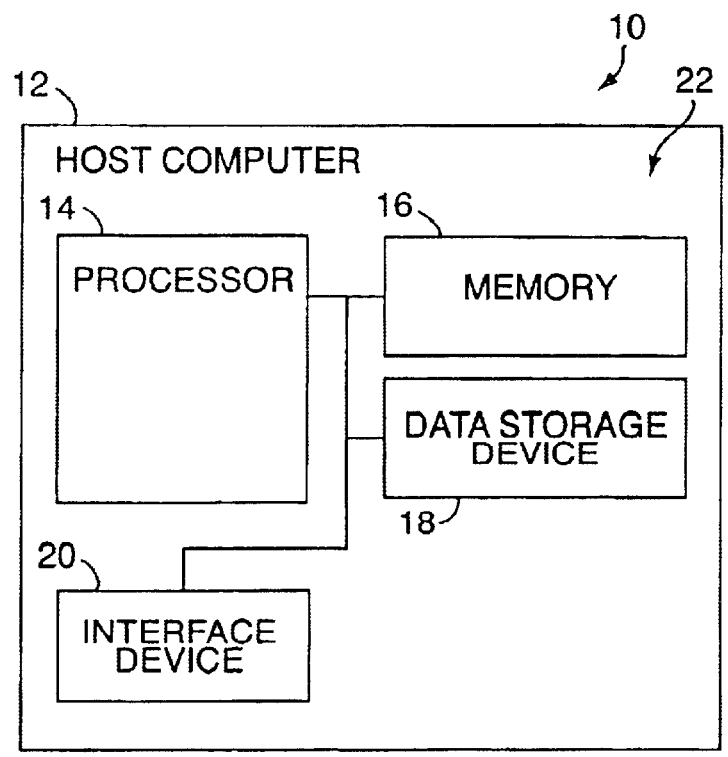
FIG. 1 is a block diagram of a computer system which is suitable for implementing the methodologies and systems of an embodiment of the present invention.

Referring to FIG. 1, an exemplary computer system which is suitable for implementing the methodologies and systems of an embodiment of the present invention is shown. Aspects of the present invention are described in terms of steps executed or executable on a variety of different computer systems.

Computer system 10, or host system 10, includes a host computer 12 having a processor 14, memory 16, data storage device 18, and an interface device 20. The exemplary components 22 of host computer 12 are operably connected via an address/data bus which is not specifically designated. The memory 16 can, and preferably does include a volatile memory (e.g. random access memory) which is coupled with the data bus for storing information and instructions for the processor 14, and a non-volatile memory (e.g. read only memory) coupled with the data bus for storing static information and instructions for processor. The data storage device 18 can comprise a mass storage device. The host computer 12 constitutes a hardware platform which executes instructions to implement the application program(s) described just below. It will be understood that the system 10, as set forth in FIG. 1, is a schematic representation only. Accordingly, the system as described above and below can be implemented as an integral stand alone system as suggested by FIG. 1, or can include separate component parts which are interconnected and operable for implementing the invention described below.

The interface device 20 preferably comprises a multi-user network interface (e.g. an Internet interface) which couples the computer system 10 to a multi-user system (e.g. the Internet in one embodiment of the present invention). The interface device 20 is coupled to permit communication with various application programs contained on the hardware platform defined by the computer system 10.

As mentioned above, and in a preferred implementation of the present invention, the interface device 20 comprises an Internet interface. The Internet is a well known connection of world wide computer systems that operate using a well known Internet protocol. The Internet is one type of multi-user computer system. Other Internet applications (e.g. using specific protocols) operate on top of the Internet protocol. One such application is the well known world wide web or "www" Internet application which operates using the hypertext transfer protocol or http. The "www" Internet application is a "demand system" in which a user requests information from a site and the site transfers the information back to the user on-line. Also well known is the email Internet application which operates using the simple mail transport protocol or smtp. The email Internet application is a "present system" in that an information transfer command originates from a sender site and information pursuant to that command is presented to the target email address. Another Internet application is the file transfer Internet application which operates using the file transfer protocol ftp. In one embodiment, the present invention utilizes the www, email, and file transfer Internet applications as well as the Internet protocol. Other embodiments of the present invention can be implemented in other multi-user computer environments. For example, the present invention could be implemented with a dedicated multi-user system.

The computer system 10 supports a software configuration which operates under control of a conventional operating system. The operating system permits various application processes to be executed. These include, for example, a communications application which permits data transfer with various remote terminals as will become apparent below. The software environment further includes a data management, storage, and retrieval application that is utilized in connection with the data storage device 18. The data management, storage, and retrieval application organizes and stores information which will be described in greater detail below. This information is organized and stored within the environment of the operating system on one or more mass storage devices such as the data storage device 18. Other applications conventionally known may be included in the software environment comprising the computer system 10.

Figure 2:
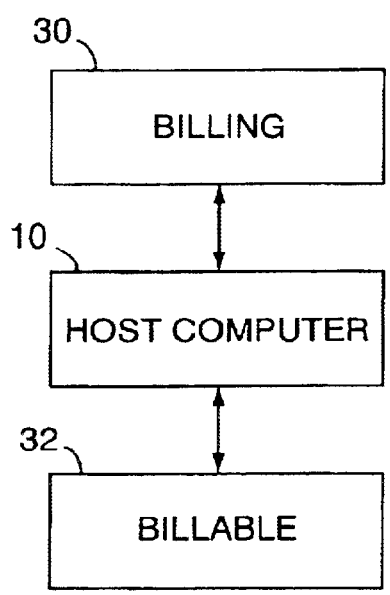
FIG. 2 is high level organizational diagram illustrating one aspect of the present invention.

In view of the foregoing computer system description and in accordance with one aspect of the invention, FIG. 2 shows a system including an exemplary computer system 10 or host system 10, a billing party 30 and a billable party 32. The host system 10 is preferably operated by a service bureau, such as an invoice processor, which provides invoice processing and analysis services to the billable party 32. The term "billing party" 30 is understood to include a law firm, company, or other source from which a bill for goods or services, or both, originates. In a preferred embodiment, the billing party 30 includes one or more law firms or legal service providers. Similarly, the term "billable party" 32 is understood to include a company or individual who is to receive a bill from one or more billing parties. Preferably, the billable party 32 is a company which receives many bills from a number of law firms. While the host system operated by a service bureau has been described, the present invention is not so limited, as the host system can be operated directly by a billable party, without departing from the present invention.

Figure 5:
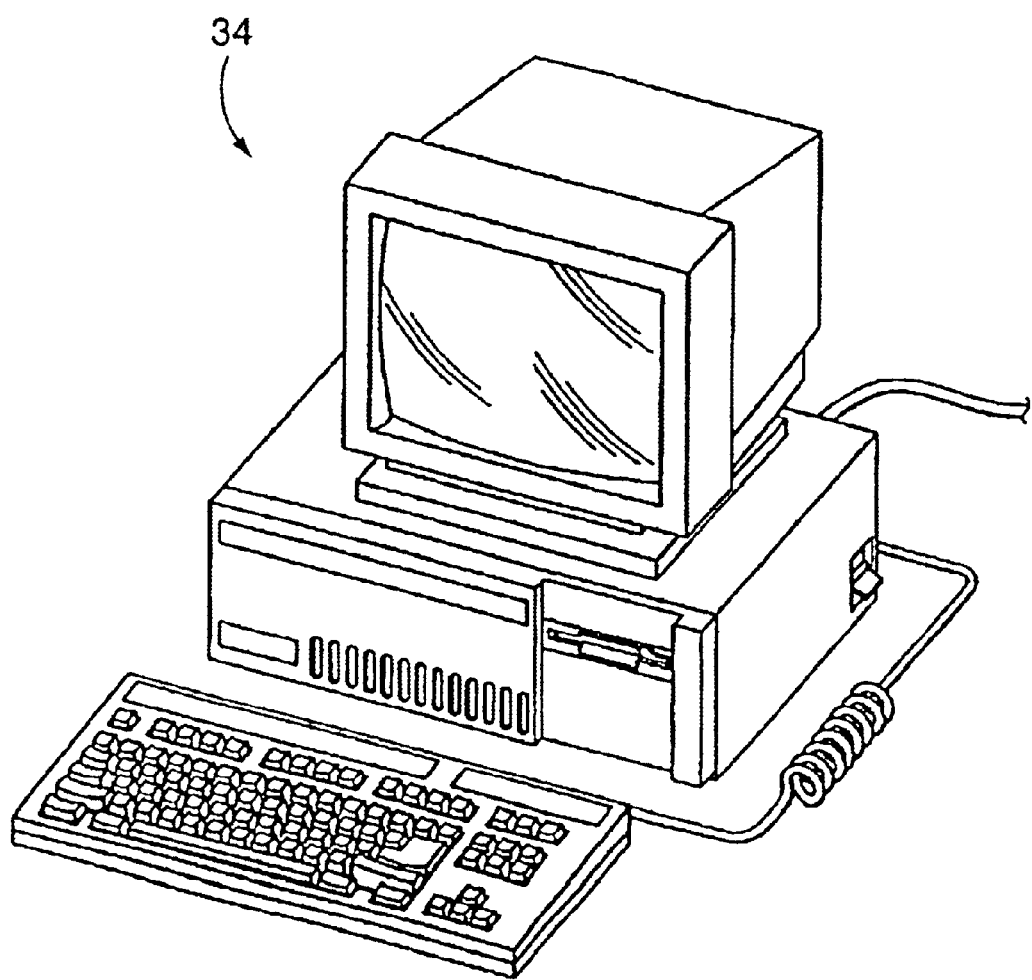
FIG. 5 is an illustration of an exemplary remote electronic access device which can be utilized in implementing the present invention.

FIG. 5 shows an example of a remote access device 34 which can be used by the billing party 30 for generation and receipt of email, generation and receipt of billing data, and access to a host system 10 web site. A similar remote access device 34 can be used by the billable party for accounting functions such as generation of payment data, and access to the host system 10 web site for entering case data and generating invoice analysis. A similar remote access device 34 can be used by the host system personnel for monitoring and maintenance of the processes of the host system 10.

Figure 6:
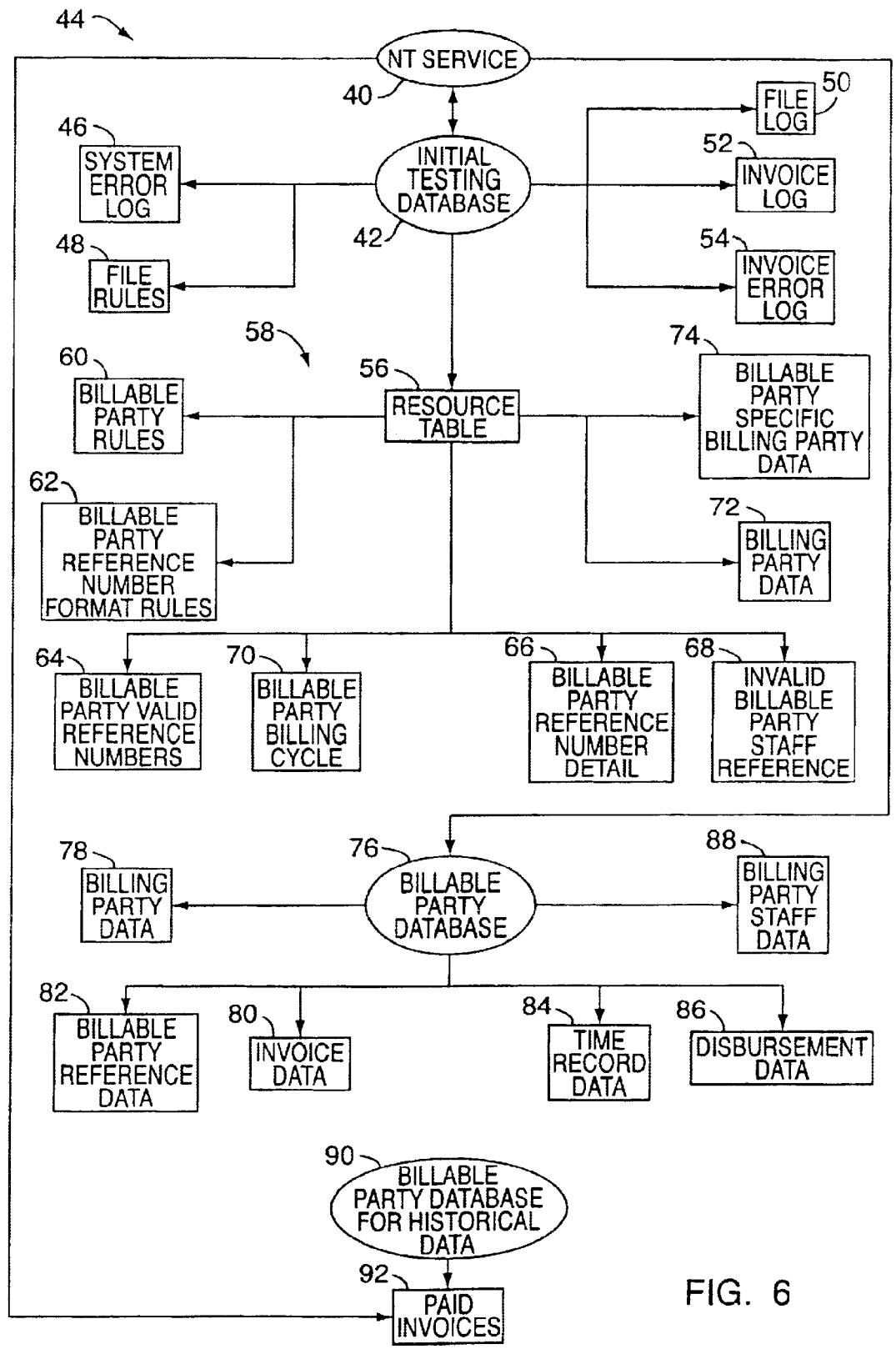
FIG. 6 is a high level organizational diagram illustrating a preferred embodiment of the present invention.

Referring to FIG. 6, the host system 10 includes an NT service 40, which is an initial testing application that runs on a Microsoft NT server for receiving the billing data, such as invoices, in an electronic format into the host system. The NT service 40 receives email containing at least one attached file containing billing data from the billing party 30. While receiving billing data via email from the billing party has been shown, the present invention is not so limited, as billing data may be downloaded to a host computer web site or received via other electronic data transmission methods such as dial up telephone, without departing from the present invention. While billing data in electronic format, such as an attached email file, has been shown and described, the present invention is not so limited, as billing data in other electronic formats, such as email, a data file downloaded to a web site, or any format into which billing data can be recorded so that it may be automatically operated upon by a computer, can be utilized without departing from the present invention.

Still referring to FIG. 6, an initial testing database 42 contains tables 44 that store the billable party's rules for testing invoices. A system error log table 46 is in communication with the NT service 40 for containing errors generated if the NT service detects an error while operating. A file rules table 48 contains a set of rules that check the incoming file format for validation.

Rules are data in the form of SQL statements stored in rules tables and databases which are executed to validate the invoice data file and any invoice data, such as invoices, included in the invoice data file. The executed SQL statements perform comparisons of the invoice data file and invoice data with previously defined data contained in the SQL statements. For example, an invoice must include a header record of type "~10". An executed SQL statement compares the first line of the invoice against the record type of "~10" stored in the SQL statement. If the record type in the invoice data file does not match the record type in the SQL statement, an error is detected, and error handling is performed. In addition, instead of hard coding record type "~10" in the SQL statement, the SQL statement may reference a table which contains valid record types to acquire record type "~10" to perform the comparison.

SQL statements may also perform sophisticated calculations and comparisons in order to produce a data value to be used in a comparison. For instance, a SQL statement computes the invoice total amount based on processing amounts in individual invoice detail lines, and compares the computed invoice total with an invoice total provided for the invoice in the invoice data file. If the comparison fails, error handling is performed.

Still referring to FIG. 6, a file log table 50 contains data on every invoice data file which is processed by the host system 10, including a unique transaction number applied to each file. An invoice log table 52 contains data on every invoice processed by the host system 10. An invoice error log table 54 contains data on invoice errors from each invoice processed by the host system 10.

Continuing to refer to FIG. 6, a resource table 56 connects and established a table structure 58 for each billable party 32. The resource table 56 also contains system data for each billable party 32. While each billable party 32 has their own set of tables with a unique naming convention for each billable party, the table structure 58 is the same for all billable parties. A billable party rules table 60 contains a set of rules defined by the billable party 32 in the form of SQL statements. There are two types of rules, error rules and warning rules. The validation process stops processing an invoice which fails the comparison with an error rule, while an invoice which fails the comparison with a warning rule continues to the next validation comparison. Failing either the error rule or warning rule generates an electronic notification message which is sent to the billing party 32 via email upon completion of the billing information processing. While an electronic notification via email has been described, the present invention is not so limited, as any other method of electronic notification, such as using Internet "push" technology or facsimile in electronic format, may be used without departing from the present invention.

Referring to FIG. 6, a billable party reference number format rules table 62 contains data used for matching patterns against reference numbers contained in each invoice. If the reference number does not match any of the patterns, the associated invoice is failed and a message is generated for the billing party 30. A billable party valid reference numbers table 64 contains valid client reference numbers, while a billable party reference number detail table 66 contains billable party data on each specific reference number used. An invalid billable party staff reference table 68 contains a list of invalid billable party staff names. If an invoice contains a reference to an invalid staff member contained in this table 68, the invoice fails and a message is generated for the billing party 30.

Continuing to refer to FIG. 6, a billable party billing cycle table 70 defines the billing period for the billable party 32. The billing period can be set to specific dates or days of the week. A billing party data table 72 contains data on all billing parties 30 that are authorized to use the host system 10. A billable party specific billing party data table 74 contains data relating to a particular billable party 32, such as billable party required billing data and billing party 30 data. Each billable party 32 has a billable party database 76 for storing invoice data which has passed initial testing and is being held for final processing. Additional types of billable party specific tables can also be stored in the billable party database 76.

Still referring to FIG. 6, a firm data table 78 contains data about the billing party 30, such as company name, billing address, phone number and federal tax id. An invoice data table 80 stores invoice data such as billing party ID, invoice number, invoice total, total of invoice time records, total of invoice disbursements, billable party reference number, billable party staff reference, and the percent for which the billable party is responsible. The data in the invoice data table 80 is compared to the totals and data in other tables, such as a billable party reference data table 82, a time record data table 84, a disbursement data table 86 and the firm table 78.

Continuing to refer to FIG. 6, the billable party reference data table 82 stores data that the billable party uses to reference a billing party matter. The data in the billable party reference data table 82 includes firm identification code (ID), client reference number, billing party reference number, contact information, and corporate billing codes, such as task codes. The time record data table 84 contains data such as the billing party or firm ID, the invoice number, amount of billing time, billing rate, billing party staff, and corporate billing codes, such as American Bar Association (ABA) approved Uniform Task-Based Management System litigation code set (UTBMS task codes), and is used to store the time records included in the billing data from the billing party 30. Each time record represents a single time billing entry for a task or part of a task for a legal matter for the billable party 32. While the use of UTBMS task codes has been shown and described, the present invention is not so limited, as other corporate billing codes, such as codes relating to insurance claim processing, transactional law matters or any other type of business, may be used without departing from the present invention.

Referring to FIG. 6, the disbursement data table 86 includes the data such as the billing party or firm ID, the invoice number, the client reference number, date of the disbursement, hours and number of copies, disbursement category, and corporate billing codes, such as the UTMBS task codes. The billing party staff data table 88 contains data such as the billing party or firm ID, staff member name, billing rate, position and firm codes.

Continuing to refer to FIG. 6, a billable party database for historical information table 90 includes data on all of the past paid invoices. The table 90 also contains data, such as case budgets, entered by the billable party 32 for analysis relating to past billing data. A paid invoices table 92 contains data such as the billing party ID, the invoice number, the date of the invoice, the invoice total, a total of the time records, a total of the disbursements, a billable party reference number, a billable party staff reference, and the percent of the invoice for which the billable party 32 is responsible.

Figure 7A:
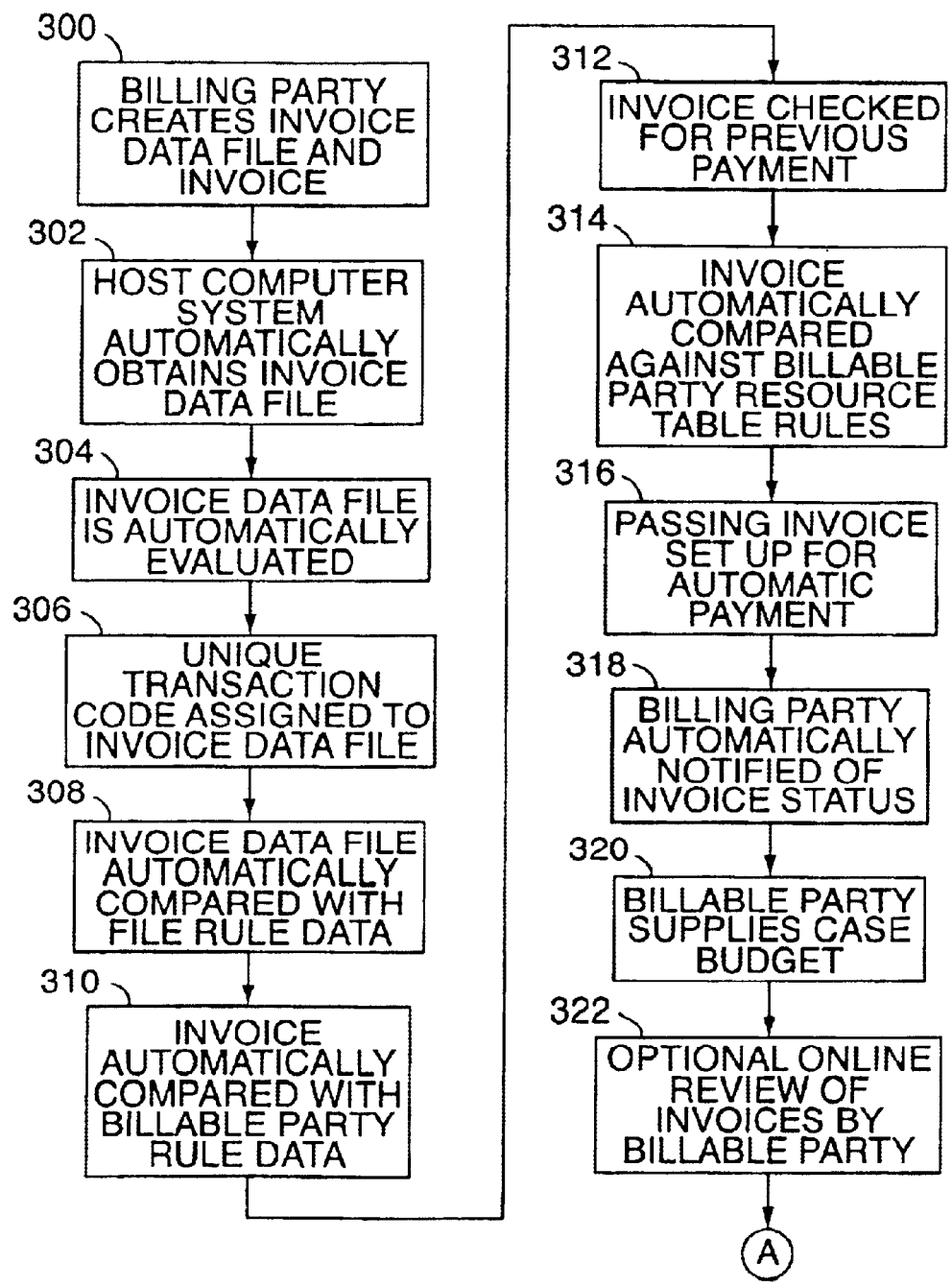
FIGS. 7A and 7B are a flow diagram illustrating certain methodical aspects of the present invention.
Figure 7B:
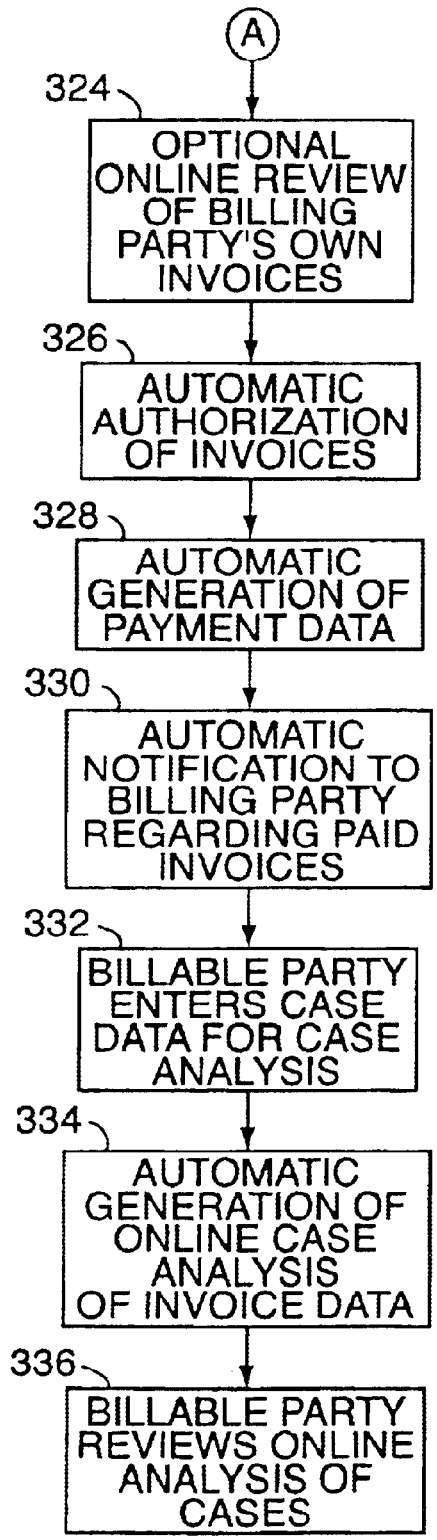

Referring to FIGS. 7A and 7B, the system and method is directed to a invoice processing system 10 including the automatic submission, automatic evaluation, automatic payment and extensive analysis of legally-related invoices. In a step 300, invoices are created in a data format specified by the host system 10 by the billing party 30, and inserted in an invoice data file by the billing party. The formatted invoices can be created by billing software provided by the host system 10 to the billing party 30, or the billing party's existing billing software can be modified to generate invoices in the host system format. In order to create and format the invoice data file and invoices in the host system format, the billing party billing software includes data such as billing party data, billable party reference data, invoice data, disbursement data, time record data and staff data.

Still referring to FIGS. 7A and 7B, in a step 302, the invoice data file is submitted to the host system 10 as an attachment to an email message to the host system over the internet. An invoice data file can also be submitted by downloading the invoice data file to the host system's internet web site using encryption, such as secure socket layer protocol (SSL). The email receiving process and the web site downloading process are operated by the NT service 40, which functions automatically to open email and pass the invoice data file to the evaluation process. While receiving billing information from the billing party via email has been shown, the present invention is not so limited, as billing information may be downloaded to the host computer web site or received via other electronic data transmission methods such as dial up telephone, without departing from the present invention. While using encryption, such as SSL has been shown, the present invention is not so limited, as other means of encryption, such as the use of public key encryption and digital certificates for the attached or downloaded invoice data file may also be employed, without departing from the present invention.

Still referring to the step 302, the functioning of the NT service 40 can be debugged and corrected, if necessary, from a programming interface, such as a screen and keyboard. If an error occurs during the invoice data file receiving process, error data is stored in the system error log table 46 for examination by host system 10 maintenance personnel, and an email notification is sent to the technical support staff. The NT service 40 is self correcting and automatically responds to most errors. For instance, if a corrupt file causes an error, the file is forwarded to technical support, the file is removed from the NT service 40, and the NT service automatically restarts. If an error occurs within the NT service 40, such as a memory error or lack of computer resources, the NT service reboots the computer, which often clears the error, and the NT service automatically restarts.

Continuing to refer to FIGS. 7A and 7B, in a step 304, an automatic file level evaluation of the invoice data file is performed. The email, if used, is opened, and a check is made for invoice data file attachments. If an attachment is not present, an error message is generated to the billing party 30. If an attachment is present, the type of the attachment is checked. If the file type is invalid, an error message is generated to the billing party 30. Attachment files can use a compressed, or zipped format, and are automatically unzipped for further processing. If the invoice data file fails the file level checking, the billing party 30 is automatically notified with an email error message, which includes the reason for the failure. The status of each invoice data file that is received by host system 10 is stored in the file log table 50. Similarly, the status of each invoice contained in the invoice data file is stored in the invoice log table 52. An error generated in response to evaluating an invoice is stored in the invoice error log table 54. The invoice data file, having passed preliminary file level evaluation, is converted to an internal file SQL format for storage and further processing. The invoice data file is stored in the initial testing database 42 to continue the evaluation process.

Continuing to refer to FIGS. 7A and 7B, in a step 306, a unique transaction code is assigned to each invoice data file as it is obtained, and is assigned to each invoice contained within the invoice data file. The unique transaction code permits the host system 10 to differentiate between invoices which have been resubmitted. For example, an invoice may be submitted in a first invoice data file, rejected, corrected by the billing party 30 and resubmitted in a second invoice data file to the host system 10. The host system 10 can differentiate between the two identical invoice numbers because of the addition of the different unique transaction codes to the first and second invoice data files, and the addition of the transaction code to the invoices contained in the invoice data files.

Still referring to FIGS. 7A and 7B, in a step 308, a more detailed automatic file level validation check is performed for essential data, such as whether the file contains an invoice, and that the time, disbursement and other records which make up the invoice are in the proper format. The file level validation check is performed by executing the SQL statements in the file rules table 48 established by the host system 10. If the invoice data file fails the file level checking, the billing party 30 is automatically notified by means of an email error message which provides the reason for the failure. In a step 310, further automatic evaluation is performed upon the invoice data or invoices contained in the invoice data file, rather than upon the invoice data file itself.

Continuing to refer to FIGS. 7A and 7B, in a step 310, the invoices are subjected to a series of automatic evaluations according to rules established by the billable party 32, and stored in the billable party rules table 60. As with the file rules, the billable party rules are SQL statements. Utilizing the billable party rules, the invoices in the initial testing database 42 is compared with each other for duplicate invoice numbers, and other tables are used to check for missing invoice number references. As the system processes the invoices in the initial testing database 42, any errors found are logged in the invoice error log 54, an error message is added to a reply message to be automatically emailed to the billing party 30, and the invoice is removed from further evaluation.

Still referring to FIGS. 7A and 7B, in a step 312, the invoice is automatically evaluated against the previously paid invoices in the billable party database for historical data 90. If the invoice was previously paid, the standard error handling process is performed, including: logging an error in the invoice error log 54; adding an error message specifying that the cause of the failure, such as that the invoice was already paid, is added to a reply message to be automatically emailed to the billing party 30; and removing the invoice from further evaluation. The invoice is also evaluated for special reference numbers which invoke special invoice processing. Additional tables containing special reference number rules are used for evaluating the invoices with the special reference number. The invoice is also checked for invalid dates, the finding of which invokes the standard error handling including the generation of an appropriate error message.

Still referring to FIGS. 7A and 7B, in a step 314, the invoice is automatically validated using the rules in the tables referenced by the resource table 56, including the billable party rules table 60. The number of rules and rule tables vary from billable party 32 to billable party. The general nature of the rules is a confirmation of mathematical checks comparing the individual invoice records such as time and disbursement records, against an invoice total record including time totals, disbursement totals and invoice totals, to make sure the totals are correct. The invoice is also checked for essential billable party data, which varies depending upon the billable party 32.

Continuing to refer to the step 314, the invoice is compared with rules in the following tables: billable party rules table 60, billable party reference number format rules table 62, billable party valid reference numbers table 64, billable party reference number detail table 66, invalid billable party staff reference table 68, billing party data table 72, and billable party specific billing party data table 74. In addition, as each invoice time record is evaluated, a comparison is made against the billing party staff member table. If a staff member is not authorized to be working on a case, and therefore does not appear in the table, the invoice fails the evaluation. The standard error handling, including an appropriate error message, is performed.

Continuing to refer to FIGS. 7A and 7B, in a step 316, an invoice which passes the evaluation is automatically routed through the NT service 40 to the billable party database 76 for final processing. All invoice data files from the billing party 30, and at each stage of processing, are automatically replicated to a backup storage system to provide data protection.

In summary, shortly after billing party 30 submits billing data to the host system 10, the billing party is notified by an email reply from the host system whether the billing data has passed or failed the comparison and evaluation process. This gives the billing party 30 the ability to correct any issues with the submitted invoice and resubmit the invoice to the host system 10 to have it paid in the same week. The messages emailed to the billing party 30 supply sufficient detail to allow the billing party to make changes to the billing data in a timely manner.

Referring to FIGS. 7A, 7B, 8 and 9, and the step 316, once the invoice has passed the automatic comparisons, the invoice is automatically added to the billable party database 76 for payment processing on the schedule defined by the billable party in the billable party billing cycle table 72. Preferably, the invoice is automatically paid by the billable party 32, but the billable party can evaluate the invoice before determining whether to approve the invoice for payment. The evaluation process includes on-line reports comparing the invoice with previous invoice and payment totals for the matter. The invoice and previous invoice and payment totals are detailed and sorted by ABA UTBMS categories 100, such as pretrial pleadings/motions 102, discovery 104, trial preparation 106, appeal 108, and various disbursement categories 110, as appropriate.

Referring to FIGS. 7A and 7B, and in a step 318, the billing party 30 is automatically emailed a message including a summary of the processed invoice data file and invoices along with any error messages. While automatically emailing messages to the billing party has been shown and described, the present invention is not so limited, as messages may be automatically transmitted to the billing party by other means, such as automatically "pushing" messages to the billable party, without departing from the present invention. The billing party 30 can correct the invoice data file or invoice in accord with the error message and resubmit the invoice data file or invoice. As described previously, errors include format errors, consistency errors, preapproval failure errors, and duplicate submission errors.

Referring to FIGS. 7A, 7B, 8 and 9, in a step 320, the billable party 32 can enter budget amounts 112 for each case, separated by UTBMS categories 100, and by percentage of total case time 114, case hours 116, and case costs 118, as well as an hourly rate 120, total estimated hours 122 and case difficulty 124. The billable party can compare the actual case totals with the budgeted amount for each UTBMS category 100, both for evaluating a particular invoice, as well as for future billing party case assignments.

Referring to FIGS. 7A and 7B, and in a step 322, initially a billable party 32 may choose to evaluate the invoices which have passed the automatic comparisons before approving payment. After the billable party 32 becomes accustomed to and comfortable with the host system 10 processing, the billable party utilizes the automatic payment generation of the host system, eliminating time consuming and costly human intervention. For legally related invoices, automatic authorization of invoices eliminates the viewing of the invoices by a party besides the billing party 30, such as a law firm, and the billable party 32, and preserves client confidentiality and attorney/client privilege.

Still referring to FIGS. 7A and 7B, and in a step 324, the billing party 30 can also review its paid and unpaid invoices on-line on the host system 10 web site, if the billable party 32 allows. In a step 326, if the invoice evaluation is not completed within a billable party specified period of time, the host system 10 automatically authorizes the invoice for payment.

Continuing to refer to FIGS. 7A and 7B, in a step 328, a payment file is automatically created by the host system 10 which includes the total dollar amount of invoices to be automatically paid (minus host system fees). The payment file uses a format defined by the billable party 32, and is transferred to the billable party for inclusion in the billable party's Electronic Funds Transfer (EFT) system to transfer the invoice payment due directly to the financial account designated by the billing party 30. Depending upon the billable party's preference, the invoice payment can be made by EFT transfer directly to the billing party's 30 financial account from the billable party's 32 financial account or the host system's 10 financial account.

Still referring to the step 328, the host system 10 automatically provides an append file including financial data for input to the billable party's 32 accounting system for recording the payments made to the billing party 30. The financial data includes data such as claim, matter, and case number, billing party's unique identifier, such as a tax ID, the billing party name, an invoice amount, and an invoice data or date of invoice processing. The financial data can also include billable party departments and payment type codes, which is supplied by the billable party for automatic inclusion in the append file, and invoice analysis. The host system 10 can subtotal or format the financial data posted to the billable party's 32 accounting system by billable party department, type of payment, or by many other data fields, as the billable party requests. While financial data has been shown and described to include billable party department, the present invention is not so limited, as financial data may include any data relating to invoices, and data which a billable party wishes to use for analysis, such as payment type codes assigned to groups of billing parties, without departing from the present invention.

Referring to FIGS. 7A and 7B, and in a step 330, a summary message is automatically generated by the host system 10 to automatically notify the billing party 30 by email regarding the total dollar amount of the invoices to be paid, along with the status of the individual invoices, such as paid or rejected. The summary email message is automatically electronically transmitted to the billing party.

Referring to FIGS. 7A, 7B, 10 and 11, and in a step 332, additional on-line reports are available to the billable party 32 on the host computer 10 web site for analysis such as, how many matters are open, which billing parties 20 are working on the matters, which attorneys at the billing parties are working on the matters, how much time the attorneys are spending on each matter, and who else is working on the matter. Some types of analysis require additional data for analysis, such as case related data, in addition to the invoice related data. The host computer 10 provides interactive computer screens so that the billable party 32 can supply case related data, such as case budget data, on the host web site, such as a type of case 126, a case jurisdiction 128, a plaintiff counsel 130, an initial demand by the plaintiff 132, an estimated liability to billable party 134, and a limit on the amount the billable party will expend 136. Other data used for analysis includes an estimate of the probability of trial 138 and an estimate of complexity of the case 140, along with an estimate of the expected distribution of case hours 142 within the personnel of the billing party.

Still referring to FIGS. 7A, 7B, 10 and 11, and in a step 334, the billable party 32 analyzes past and present cases across multiple cases and by billing party 30. The billable party 32 can select analysis displayed by a total case cost 144, total hours 146, total expenses 148, an estimated exposure 150 to loss, a cost to estimated exposure ratio 152, budgeted hours 154, or variance from budget 156. Cases and related invoices can also be flagged and tracked for particular review 158. In addition, cases which deviate from the defined or calculated normal values can be displayed, along with the reasons for the deviation, such as high expense 160 or high case cost 162. These reports provide control to the managers of the billable party 32 over case costs, and help ensure that the billable party is being properly billed so that the billable party 32 can be confident that they are getting a good value for their money from the billing party 30.

Figure 3:
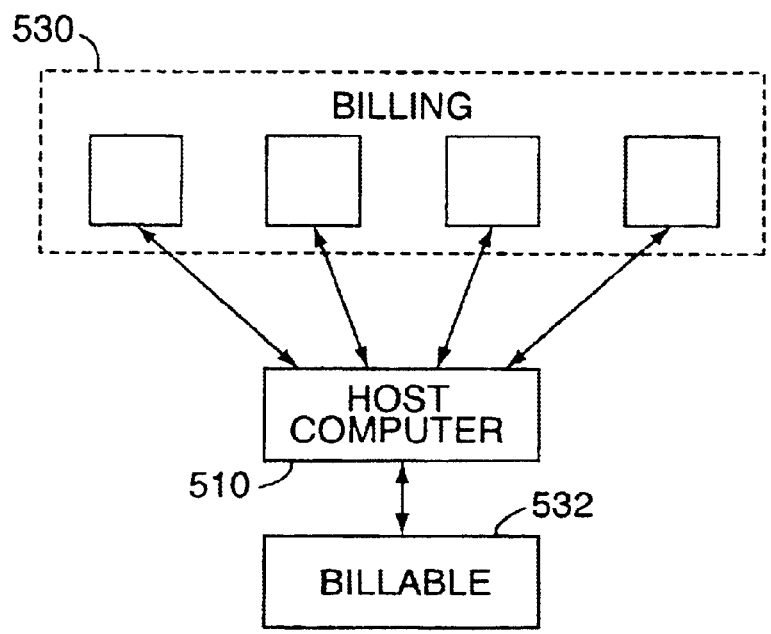
FIG. 3 is high level organizational diagram illustrating one aspect of the present invention.
Figure 4:
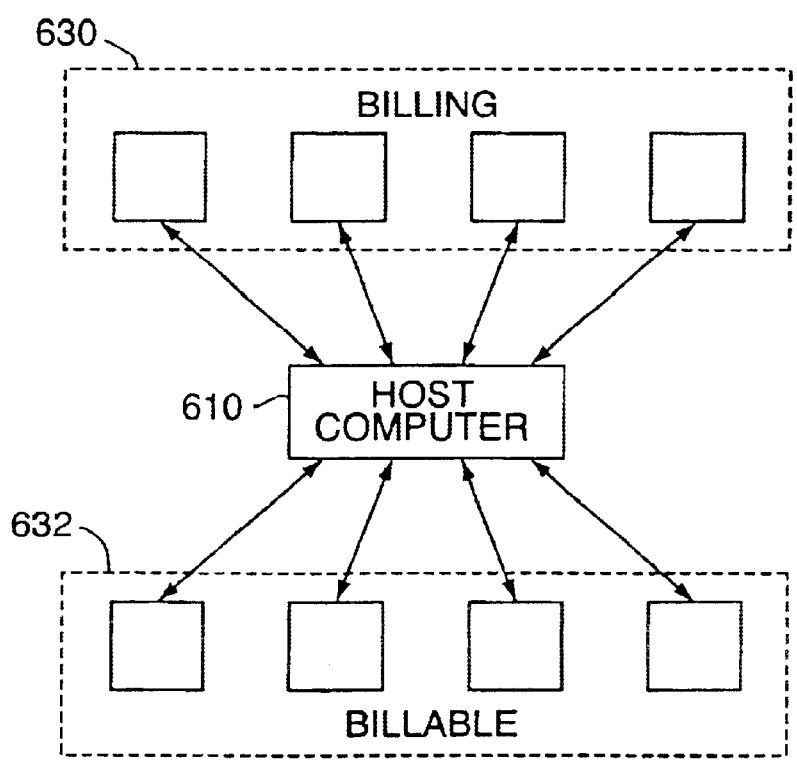
FIG. 4 is high level organizational diagram illustrating one aspect of the present invention.

Referring an alternate embodiment in FIG. 3, a host computer system 510 automatically processes invoice data files and invoices from a plurality of billing parties 530 for a single billable party 532. While four billing parties are shown, invoices for a virtually unlimited number of billing parties can be processed without departing from the present invention. Referring to a preferred embodiment in FIG. 4, a host computer system 610 automatically processes invoice data files and invoices from a plurality of billing parties 630 for a plurality of billable parties 632. While four billing parties and four billable parties have been shown, invoices for a virtually unlimited number of billing parties and billable parties may be processed without departing from the present invention.

It should be understood that the foregoing description is only illustrative of the invention. Various alternatives and modifications can be devised by those skilled in the art without departing from the invention. For instance, while a method and system for automatically generating payment in response to receiving billing data transmitted electronically has been shown and described, the method and system is also applicable to billing data which is transmitted photonically, or by any other transmission method through which billing data can be automatically processed. In addition, the method can be embodied in software, hardware or firmware, without departing from the present invention, and the software could be embodied in object oriented code or procedural code without departing from the present invention. Accordingly, the present invention encompasses a number of alternatives, modifications and variants that fall within the scope of the appended claims.

What is claimed is:

1. A computerized method for automatically processing billing data generated by a billing party for payment for services provided to a billable party, said method comprising the steps of:

automatically obtaining billing data in an electronic format from the billing party, said billing data including a listing of the specific tasks undertaken by the billing party as part of the services rendered to the billable party, wherein:

the listing includes a plurality of single time billing entries each representing time spent by a billing party staff member in performing one of the specific tasks or a portion thereof; and the single time billing entries are identified by billing codes representing the specific tasks undertaken by the billing party as part of the services rendered;

automatically comparing said billing data with rule data defined by said billable party, wherein a portion of the rule data relates to assessing the single time billing entries for the specific tasks undertaken by the billing party as part of the services rendered to the billable party; and automatically authorizing generation of payment data if said billing data satisfies said comparison with said rule data, wherein:

the rule data comprises a plurality of warning rules and a plurality of error rules;

the step of automatically comparing the billing data with the rule data comprises the sub-steps of, if the billing data fails to satisfy any of the error rules: ceasing further evaluation of the billing data; and automatically electronically notifying the billing party that the billing data failed to satisfy the error rules, without automatically authorizing generation of payment data; and the step of automatically authorizing generation of payment data comprise the sub-steps of:

if the billing data satisfies all the warning rules and error rules, automatically authorizing generation of payment data according to the billing data; and if the billing data satisfies all the error rules but not all the warning rules: automatically authorizing generation of payment data according to the billing data; and automatically electronically notifying the billing party that the billing data failed to satisfy the warning rules.

2. The method of claim 1 wherein said rule data are stored in a rules database.

3. The method of claim 1, wherein said payment data includes financial data for input to an accounting system of the billable party.

4. The method of claim 1, wherein said payment data includes electronic funds transfer (EFT) data.

5. The method of claim 1, further comprising the steps of:
   generating a summary message specifying a billing data total amount to be paid; and
   automatically electronically notifying said billing party of said summary message.

6. The method of claim 1, further comprising the step of providing interactive computer screens so that said billable party supplies analysis data for inclusion in billing data analysis reports.

7. The method of claim 6, wherein said analysis data includes case budget data including total case time, case hours, case costs, hourly rate, and case difficulty.

* * * * *